United States Patent [19]

Stahre et al.

[11] 4,133,358

[45] Jan. 9, 1979

[54] METHOD OF TREATING TREES AND A MACHINE FOR PRACTICING THE METHOD

[75] Inventors: Håkan A. L. Stahre; Dane E. R. Glantz, both of Jönköping, Sweden

[73] Assignee: Husqvarna AB, Huskvarna, Sweden

[21] Appl. No.: 748,205

[22] Filed: Dec. 7, 1976

[30] Foreign Application Priority Data

Dec. 10, 1975 [SE] Sweden ................... 7513889

[51] Int. Cl.² ................................ A01G 23/08
[52] U.S. Cl. ......................... 144/3 D; 144/2 Z; 144/309 AC
[58] Field of Search ............ 144/2 Z, 3 D, 34 R, 144/34 E, 309 AC, 208 R, 208 E, 311; 83/928

[56] References Cited

U.S. PATENT DOCUMENTS

| 3,329,184 | 7/1967 | Longert | 144/2 Z X |
| 3,398,774 | 8/1968 | Hahn | 144/2 Z |
| 3,455,352 | 7/1969 | Sanders et al. | 144/312 |
| 3,500,882 | 3/1970 | Tanguay | 144/312 R |
| 3,529,639 | 9/1970 | Herolf | 144/2 Z |
| 3,610,300 | 10/1971 | Hoadley | 144/3 D |
| 3,763,905 | 10/1973 | Hamilton et al. | 144/2 Z |
| 3,972,357 | 8/1976 | Neal et al. | 144/2 Z |

Primary Examiner—Othell M. Simpson
Assistant Examiner—W. D. Bray
Attorney, Agent, or Firm—Holman & Stern

[57] ABSTRACT

A machine for de-branching felled trees and cutting the trees into logs comprises a vehicle having a driver's compartment at one end, a log-loading area at the other end, tree de-branching and cutting apparatus between the driver's compartment and the loading area, a log-collecting arrangement disposed on the vehicle to one side of the de-branching and cutting apparatus and which receives cut logs from the cutting apparatus and an elevated lifting device which can lift trees to be cut, deliver the trees to the de-branching and cutting apparatus and transfer cut logs from the collecting arrangement to the loading area.

4 Claims, 3 Drawing Figures

METHOD OF TREATING TREES AND A MACHINE FOR PRACTICING THE METHOD

BACKGROUND OF THE INVENTION

The present invention relates to a method of processing felled trees and an apparatus therefor. By "processing" is meant here, all the working operations which take place from the moment the tree is felled to the moment of stacking cut logs on the logstacking site.

Those tree-processing machines known hitherto are constructed to carry out some working operations on the felling site, such as de-branching of the felled tree, cutting the de-branched timber, and sorting the cut wood. Such machines, however, are not suitable for loading and transporting purposes, or for maneuvering in inaccessible terrain.

When trees are processed by means of such machines, a number of working operations which have already been effected must therefore be repeated, for example such working operations as re-positioning, stacking, reloading etc. Processing of the trees thus becomes time consuming and ineffective, and hence it must be considered desirable to integrate all of the working operations.

BRIEF SUMMARY OF THE INVENTION

An object of the present invention is to propose a process including the recovery of valuable forestry products and the transportation of such products, in which the working operations necessary therefore are carried out sequentially in an uninterrupted manner. In accordance with the invention, a machine with which this process can be carried out has means for lifting, de-branching, feeding, cutting, conveying etc. The method of processing a felled tree is carried out in the combination of the following working operations:

(a) lifting the tree at one end and feeding the same to a de-branching apparatus,
(b) de-branching the tree in the de-branching apparatus,
(c) cutting the tree into logs and catching the logs on a collecting arm or in a collecting tray
   repeating the above working operations an arbitrarily selected number of times,
(d) transferring the logs on the collecting arm or the collecting tray to a loading space
(e) transporting the logs in the loading space to a stacking site at which said logs are unloaded.

A machine constructed in accordance with the invention is comprised of wheels, control means, drive motor, transmission and a power output and a frame structure for carrying means for defining at least one loading space, and characterised in that adjacent the loading space there is arranged a de-branching and/or cutting apparatus having feed means, and at least one lifting means driven by at least one drive motor and operated by means of control devices placed adjacent to a driving cabin on or adjacent the machine.

DETAILED DESCRIPTION OF THE INVENTION

Figure 1:
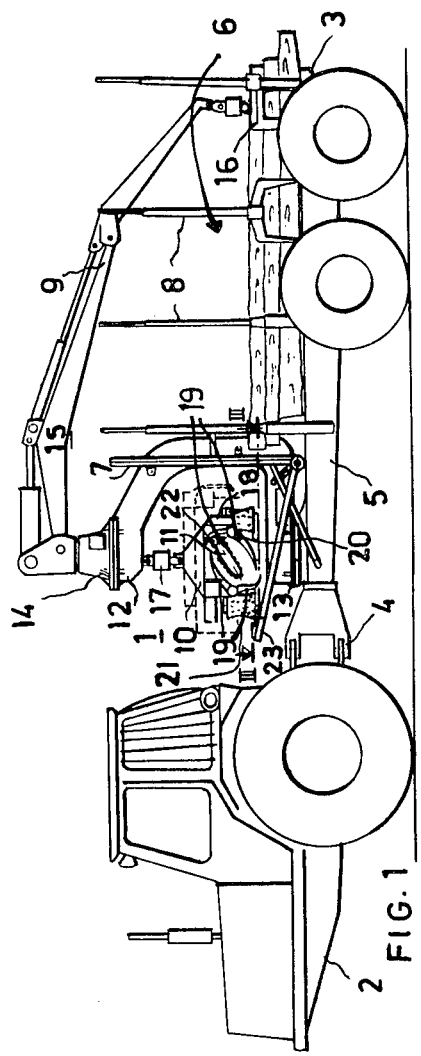
FIG. 1 is a side elevation of a machine constructed in accordance with the invention.

The machine has a basic vehicle construction found with known transporting vehicles, these vehicles being lumped under the general designation "scooter." In the illustrated embodiment, the scooter serves as a vehicle for carrying those pieces of apparatus used for processing a felled tree. The chassis 1 of the vehicle is divided into a drive-unit 2 and a load-unit 3 coupled together by a coupling 4. The load unit comprises a frame structure 5 on which gates 7 and posts 8 are arranged in a manner to define a loading space 6.

The apparatus for processing a felled tree comprise a lifting means 9, a de-branching apparatus 10, and a cutting device 11. In the illustrated embodiment, the lifting means has the form of a C-shaped bracket structure 12 fixedly mounted to a support means 13 on the frame structure 5. Arranged in the upper end of the bracket structure 12 is a pivotable head 14, said head forming an attachment means for a pivotable lifting arm 15. Provided on the free end of the lifting arm 15 is a gripping device 16, the lifting arm and the gripping device being hydraulically operable to grip and lift the trunk of a tree.

The bracket structure 12 also carries the de-branching apparatus 10 and the cutting means 11. The de-branching means 10 is suspended on a pivotable coupling 17 beneath the pivotable head 14 and can be swung both in the horizontal plane and in different vertical planes (the dash lines in FIG. 1 show the de-branching apparatus swung through 90°). The de-branching apparatus comprises a body 18 in which four knives 19 are journalled, said knives being symmetrically operated in pairs by hydraulic cylinders so that said knives move towards and away from each other in the manner of shears. A pair of arms 20, which are also journalled in the body 18, support a pair of rollers 21 having dished surfaces provided with barbs or spikes. The rollers are operated by means of hydraulic motors and can be moved towards and away from each other by means of hydraulic cylinders arranged between the arms 20 and the body 18. The briefly described apparatus is only an example of the form which such apparatus may take, and may naturally be replaced with de-branching apparatus of a different construction. The characteristic feature of the described apparatus is that the tree is fed through the apparatus by the rollers, during which feed movement the knives clamp around the trunk of the tree from different directions, to de-branch the same.

Supplementary to the de-branching apparatus is a chain saw 22 which is operated hydraulically to perform a swinging, cutting movement in a direction perpendicular to the feed direction of the tree. The tree-feed is stopped at evenly regular spaced intervals and the chain saw set into operation. The trunk can thereby be cut into predetermined lengths suitable for transport.

Figure 3:
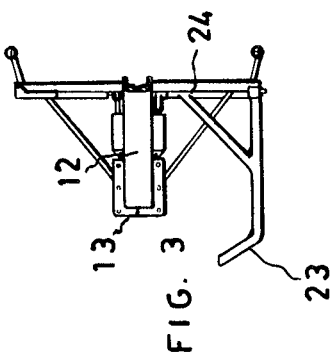
FIG. 3 is a plan view of a central section of the machine.
Figure 2:
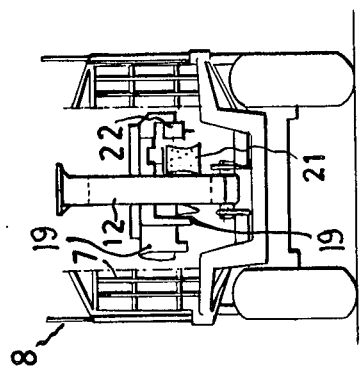
FIG. 2 is a cross-sectional view of the machine.

The machine also comprises apparatus for catching the logs produced when cutting the trunk. In the illustrated embodiment (as shown in FIG. 3) this part of the machinery comprises collapsible arms 23 arranged along the sides of the vehicle beneath the apparatus 10. These arms, only one of which is shown in FIG. 3, can support a multiplicity of logs and the arms are supported and journalled on axle 24 extending across the frame structure 5. In the transport position, the arms may be lifted up against the gates 7.

The mode of operation of the apparatus can be summarised as follows. The gripping head of the lifting means is caused to grip the trunk of a felled tree and to lift the root end of the tree in between the open knives 19 and the rollers 21. The rollers are then caused to grip the trunk, whereupon the gripping head is released. The rollers are started up and the trunk is drawn through the narrow opening presented between the four knives. The knives and the rollers are radially adjustable so that the size of the tree-receiving opening therebetween can be adjusted. Thus, as the tree is advanced through the apparatus, the trunk is de-branched in the narrow opening between the knives. The rollers are caused to stop when a predetermined length of the trunk has passed the saw 22, whereupon the saw is caused to cut the trunk, whereafter the rollers are set into operation again. The logs are caught on the arms 23, which incline rearwardly, so that the logs are successively collected in a heap adjacent the gate 7.

The machine is moved from a felling site to a further felling site, although prior to being moved the logs are transferred from the arms to the loading space 6 by means of the lifting device. The machine is moved from felling site to felling site until the loading space 6 is filled, whereupon the machine is driven to a stacking site where the logs are unloaded.

As previously mentioned, the various devices carried by the machine may be modified without departing from the method or the intended function of the apparatus. For example, the described arms can be replaced with a support platform which can be laid-out from the machine and which has upstanding side edges forming a collecting tray adjacent the vehicle. Different alternatives are also to be found for mounting the different devices on the vehicle. For example, the lifting means can be mounted on the roof of the driving cabin and the de-branching and cutting apparatus may be placed on the bonnet of the vehicle in front of the driver's cabin. A further alternative is to place the de-branching unit and/or the lifting means further back on the vehicle on the loading unit.

We claim:

1. A machine for de-branching felled trees and cutting the de-branched trees into logs comprising a wheeled vehicle, a driving and control cabin at one end of the vehicle, means defining a log-loading area at the other end of the vehicle, a frame on the vehicle defining a space between said cabin and said log-loading area, power operated apparatus including tree-feeding means, de-branching means and cutting means carried on said frame within said space, a log collecting structure mounted on the vehicle to one side of said space for receiving cut logs from said cutting means, power operated lifting means on the vehicle for delivering felled trees to said apparatus and for transferring cut logs from said collecting structure to said log-loading area, and a bracket structure on the frame, said apparatus being pivotable and rotatably mounted in the bracket structure.

2. A machine according to claim 1, characterised in that the bracket is moveably mounted on the frame structure and can be moved in the transverse direction of said frame structure.

3. A machine according to claim 2, characterised in that the bracket structure also carries the lifting means.

4. A machine according to claim 3, characterised in that the lifting means is mounted on a pivotable head above the upper defining surface of the bracket structure.

* * * * *